United States Patent [19]

Beach

[11] Patent Number: 4,933,693

[45] Date of Patent: Jun. 12, 1990

[54] CONTROL APPARATUS FOR FILM PRESSURE PLATE IN CAMERAS

[75] Inventor: David E. Beach, Stowe, Vt.

[73] Assignee: Eastman Kodak Company, Rochester, N.Y.

[21] Appl. No.: 379,748

[22] Filed: Jul. 14, 1989

[51] Int. Cl.[5] .............................................. G03B 12/00
[52] U.S. Cl. ..................................... 354/203; 352/229; 352/230
[58] Field of Search ................... 354/202, 203; 352/78, 352/229, 230

[56] References Cited

U.S. PATENT DOCUMENTS

| | | | |
|---|---|---|---|
| 2,336,279 | 12/1943 | Michalyi | 354/214 |
| 2,753,777 | 7/1956 | Faulhaber et al. | 354/203 |
| 2,949,831 | 8/1960 | Bretthaüer | 354/203 |
| 3,110,237 | 11/1963 | Scholkemeier et al. | 354/203 |
| 3,563,144 | 2/1971 | Fukimo | 354/203 |
| 4,423,943 | 1/1984 | Gold | 354/275 |
| 4,505,562 | 3/1985 | Hara et al. | 354/203 |
| 4,525,051 | 6/1985 | Wong et al. | 354/203 |
| 4,752,795 | 6/1988 | Desormeaux | 354/173.11 |
| 4,855,773 | 8/1989 | Harvey | 354/173.1 |

Primary Examiner—Brian W. Brown
Attorney, Agent, or Firm—Roger A. Fields

[57] ABSTRACT

A camera is adapted for use with a film cassette in which a film spool is rotatable to unwind a filmstrip off the spool to automatically thrust a non-protruding leader portion of the filmstrip from the cassette to enable the leader portion to be propelled in the camera over an exposure opening and to a film take-up means. The filmstrip including the leader portion has a natural tendency to curve crosswise. In the camera, a pressure plate is resiliently biased to an operative position for pressing the filmstrip flat at the exposure opening. A restraining device is operated to hold the pressure plate in a retracted position sufficiently removed from the exposure opening. This permits the filmstrip to assume its natural cross-curvature in order to significantly increase the longitudinal strength of the leader portion to facilitate its being propelled over the exposure opening and to the film take-up means responsive to unwinding rotation of the film spool. When the filmstrip is taken up at the take-up means, the restraining device releases the pressure plate for movement to its operative position.

6 Claims, 8 Drawing Sheets

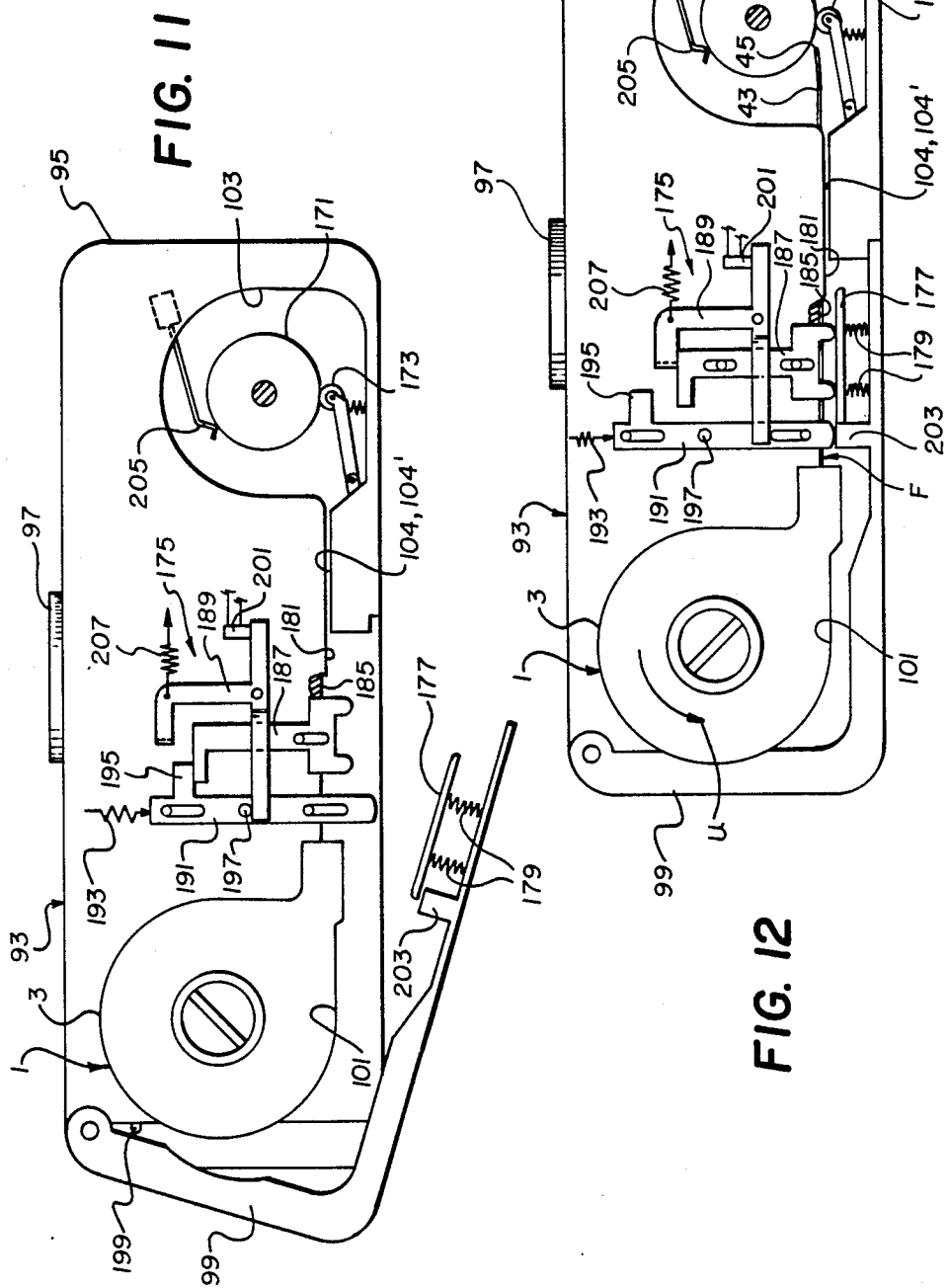

CONTROL APPARATUS FOR FILM PRESSURE PLATE IN CAMERAS

CROSS-REFERENCE TO A RELATED APPLICATION

Reference is made to commonly assigned copending application Ser. No. 221,955, entitled MOTOR-DRIVEN FILM TRANSPORT APPARATUS, and filed July 20, 1988, in the name of Donald M. Harvey.

BACKGROUND OF THE INVENTION

1. Field of the Invention

The invention relates generally to the field of photography, and particularly to a control apparatus for a film pressure plate in a photographic camera.

2. Description of the Prior Art

In conventional 35 mm film manufacturers' cassettes, such as manufactured by Eastman Kodak Company and Fuji Photo Film Co. Ltd., the filmstrip is wound on a flanged spool which is rotatably supported within a cylindrical shell. A leading portion of the filmstrip approximately 2¼ inches long, commonly referred to as a "film leader", protrudes from a light-trapped slit or mouth of the cassette shell. One end of the spool has a short axial extension which projects from the shell, enabling the spool to be turned by hand. If the spool is initially rotated in an unwinding direction, the film roll inside the shell will tend to expand radially since the inner end of the filmstrip is attached to the spool, and the fogged leader portion protruding from the slit will remain stationary. The film roll can expand radially until a non-slipping relation is established between its outermost convolution and the inner curved wall of the shell. Once this non-slipping relation exists, there is a binding effect between the film roll and the shell which prevents further rotation of the spool in the unwinding direction. Consequently, rotation of the spool in the unwinding direction cannot serve to advance the filmstrip out of the shell, and it is necessary in the typical 35 mm camera to wind the protruding leader portion onto a film take-up drum in order to draw the filmstrip out of the shell. Since the protruding leader portion must be laid over the exposure (back frame) opening in the camera during film loading, it is not uncommon to retract the film pressure plate (for holding each successive film frame flat at the exposure opening) preparatory to winding the leader Portion onto the take-up drum. See U.S. Pat. Nos. 4,525,051; 4,505,562; 3,563,144; 2,753,777; and 2,336,279.

A 35 mm film cassette has been proposed which, unlike conventional film cassettes, can be operated to automatically advance the filmstrip out of the cassette shell by rotating the film spool in the unwinding direction. The leader portion normally does not protrude from the cassette shell. Specifically, in U.S. Pat. No. 4,423,943, granted Jan. 3, 1984, there is disclosed a film cassette wherein the outermost convolution of the film roll wound on the film spool is radially constrained by respective circumferential lips of two axially spaced flanges of the spool to prevent the outermost convolution from contacting an inner curved wall of the cassette shell. The trailing end of the filmstrip is secured to the film spool, and the leading end of the filmstrip is slightly tapered along one longitudinal edge purportedly to allow it to freely extend from between the circumferential lips and rest against the shell wall. During initial unwinding rotation of the film spool, the leading end of the filmstrip is advanced along the shell wall until it reaches an entry to a film passageway in the cassette shell. Then, it is advanced into and through the film passageway to the outside of the cassette shell. The passageway has a width that is slightly less than the width of the filmstrip, thus resulting in the filmstrip being transversely bowed as it is uncoiled from the film spool, and thereby facilitating movement of the film edges under the circumferential lips of the respective flanges.

While the film cassette disclosed in U.S. Pat. No. 4,423,943 includes a non-protruding film leader which is automatically advanced to the outside of the cassette shell when the film spool is rotated in the unwinding direction, the film cassette is intended to be loaded in a camera only after the film leader is advanced to protrude from the cassette shell. In the patent, it is suggested that one manually rotate the film spool relative to the cassette shell until the leader portion can be manually grasped and attached to a film advancing device in the camera. The Cross-Referenced Application Cross-referenced application Ser. No. 221,955 discloses a film cassette in which a film spool can be rotated to unwind a filmstrip off the spool to automatically thrust a non-protruding leader portion of the filmstrip out of the cassette. The ability of the cassette to thrust the leader portion outwardly enables the leader portion to be propelled in a camera from the cassette to a take-up spool. A film transport apparatus of the camera includes a bi-directional drive member having respective positions for effecting alternate one-way driving connections with the film spool of the cassette to rotate the spool in unwinding and rewinding directions in accordance with the rotational direction of a single bi-directional drive motor. During advance of the leader portion from the cassette to the take-up spool of the camera, the take-up spool is motor-driven at a faster speed than the film spool of the cassette is rotated. When the leader portion is wound onto the take-up spool, the drive member permits the film spool to be overdriven by the resulting pull of the filmstrip exerted at the film spool. During rewinding of the filmstrip onto the film spool, the take-up spool is uncoupled from the drive motor to allow the film spool to serve as the only means for film movement.

SUMMARY OF THE INVENTION

According to the invention, there has been devised a control apparatus for a film pressure plate in a photographic camera to be used with a film cassette in which a film spool is rotatable to unwind a filmstrip off the spool to automatically thrust a non-protruding leader portion of the filmstrip from the cassette to enable the leader portion to be propelled in the camera over an exposure opening and to a film take-up means. The filmstrip including the leader portion has a natural tendency to curve crosswise. In the camera, the pressure plate is resiliently biased to an operative position for pressing the filmstrip flat at the exposure opening. A restraining device is operated to hold the pressure plate in a retracted position sufficiently removed from the exposure opening. This permits the filmstrip to assume its natural cross-curvature in order to significantly increase the longitudinal strength of the leader portion to facilitate its being propelled over the exposure opening and to the film take-up means responsive to unwinding rotation of the film spool. When the filmstrip is taken up at the take-up means, the restraining device releases the pressure plate for movement to its operative position.

BRIEF DESCRIPTION OF THE DRAWINGS

FIG. 11 is a top plan view of a control apparatus for a film pressure plate on a rear door of the camera, according to a preferred embodiment of the invention.

FIGS. 12 and 13 are top plan views similar to FIG. 12, showing operation of the control apparatus;

DETAILED DESCRIPTION OF THE PREFERRED EMBODIMENT

The invention is disclosed as being embodied preferably in a 35 mm still camera. Because the features of this type of camera are generally well known, the description which follows is directed in particular to elements forming part of or cooperating directly with the disclosed embodiment. It is to be understood, however, that other elements not specifically shown or described may take various forms known to persons of ordinary skill in the art.

Film Cassette

Figure 1:
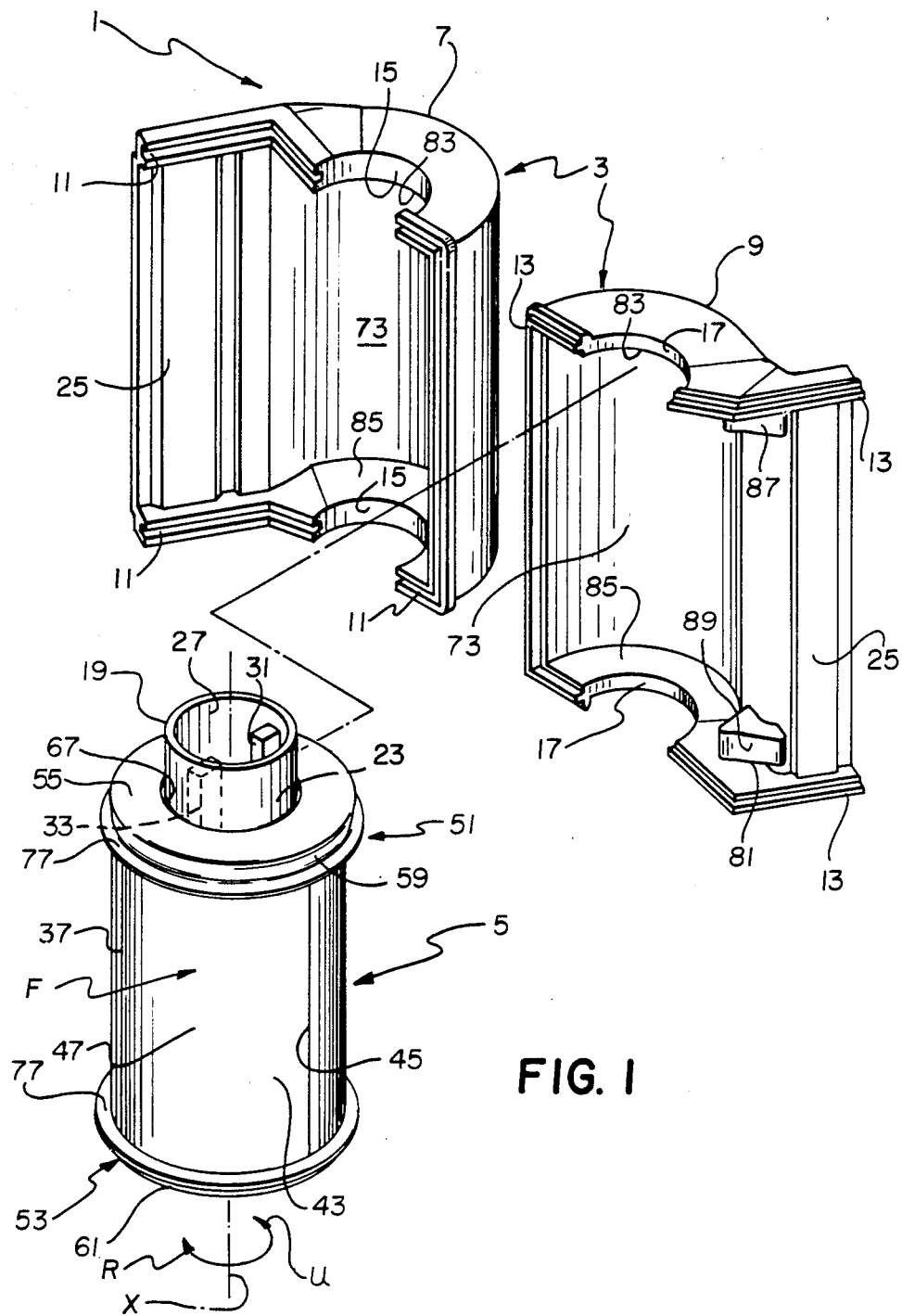
FIG. 1 is an exploded perspective view of a film cassette having a non-protruding film leader, as disclosed in the cross-referenced application.
Figure 2:
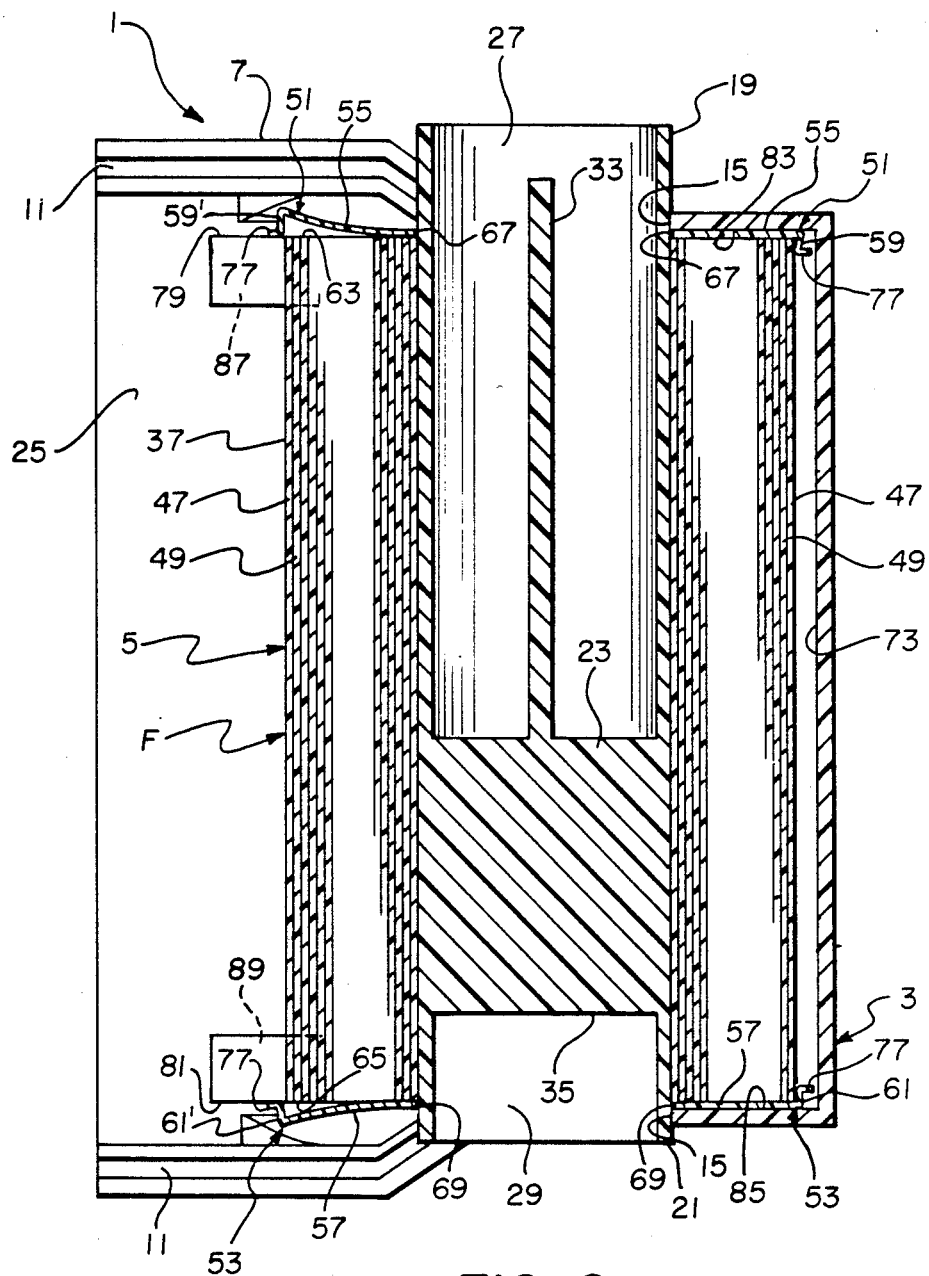
FIG. 2 is an elevation view in cross-section of the film cassette.
Figure 3:
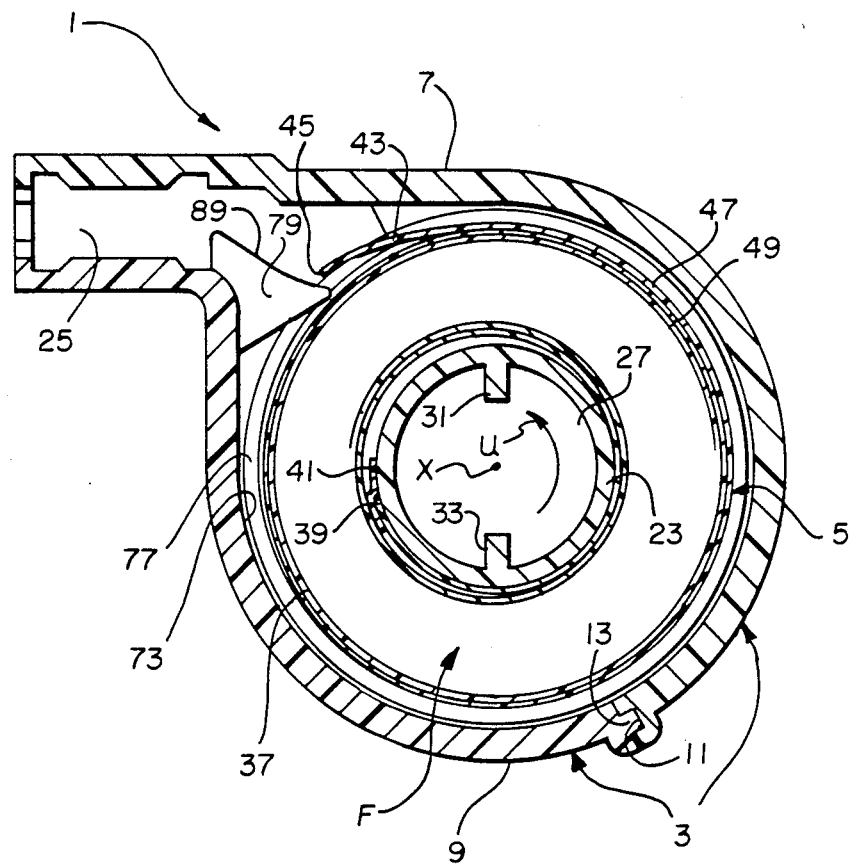
FIG. 3 is an end view in cross-section of the film cassette.

Referring now to the drawings, FIGS. 1-3 depict a 35 mm film cassette 1 generally as disclosed in the cross-referenced application. Specifically, the film cassette 1 comprises a light-tight cassette shell 3 and a film spool 5 which is rotatable about an axis X within the cassette shell. The cassette shell 3 consists of two shell halves 7 and 9 which are mated along respective groove and stepped edge portions 11 and 13. The mated halves 7 and 9 define upper and lower aligned openings 15 and 17 for relatively longer and shorter opposite end extensions 19 and 21 of a spool core or hub 23. Also, they define a light-trapped film passage slit or mouth 25. The light-trapping means for preventing ambient light from entering the film passage slit 25, although not shown, may be a known velvet or plush material which lines the interior of the slit.

The spool core 23 as shown in FIGS. 1-3 includes relatively longer and shorter coaxial holes 27 and 29 opening at the respective longer and shorter opposite end extensions 19 and 21 of the spool core. A pair of spaced keying ribs 31 and 33 integrally formed with the spool core 23 are located within the longer coaxial hole 27, and a single keying rib 35 similarly formed with the spool core is located within the shorter coaxial hole 29. The several keying ribs 31, 33, and 35 according to custom may be engaged to rotate the film spool in an unwinding direction indicated by the arrow U in FIG. 1, or to rotate the spool in a rewinding direction R opposite to the unwinding direction.

A film roll 37 comprising a convoluted 35 mm filmstrip F having a uniform width is wound about the spool core 23. As indicated in FIG. 3, the film roll 37 has an inner or trailing end 39 attached to the spool core 23 by a suitable piece of adhesive tape 41 and a film leader 43. The film leader 43 has a leading or forward end 45 and comprises 2-3 convolutions of the film roll 37. One of these leader convolutions is the outermost convolution 47 and another of them is the next inward succeeding convolution 49.

Figure 4:
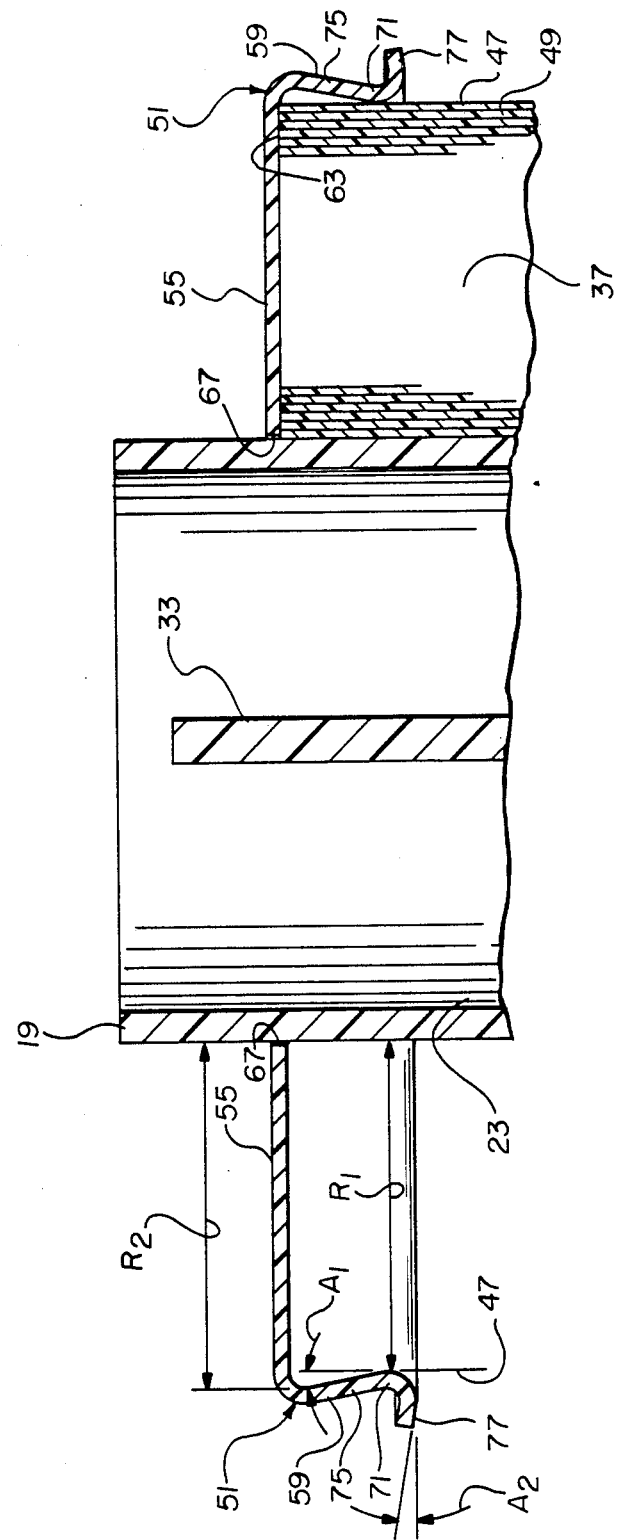
FIG. 4 is an elevation view in cross-section of one of a pair of flanges associated with a film spool within the cassette shell.

A pair of identical flanges 51 and 53 are coaxially spaced along the spool core 23 as shown in FIGS. 1 and 2. The two flanges 51 and 53 comprise respective integral disks 55 and 57 and respective integral annular lips or skirts 59 and 61 which circumferentially extend from the disks. The two disks 55 and 57 cover opposite sides, i.e. ends, 63 and 65 of the film roll 37 and they have respective central holes 67 and 69 through which the spool core 23 longitudinally extends to permit rotation of the spool core relative to the flanges 51 and 53. Each of the lips 59 and 61 as depicted in FIG. 4 includes the following:

(1) an annular constraining section 71 positioned relatively remote from one of the disks 55 and 57 a predetermined radial distance $R_1$ from the spool core 23 to enable each of the lips 59 and 61 to contact the outermost convolution 47 of the film roll 37, to radially confine the outermost convolution and thereby prevent the film roll from radially expanding or clock-springing against an inner wall 73 of the cassette shell 3;

(2) an annular relief section 75 extending from one of the disks 55 and 57 to the annular constraining section 71 of one of the lips 59 and 61 and positioned a predetermined radial distance $R_2$ from the spool core 23, greater than the radial distance $R_1$, to enable each of the lips to avoid contacting the outermost convolution 47 substantially between one of the disks and the annular constraining section; and (3) an annular free end section 77 inclined radially outwardly from the annular constraining section 71 of one of the lips 59 and 61 and away from the outermost convolution 47.

The annular relief section 75 of each of the lips 59 and 61 is inclined radially inwardly from one of the disks 55 and 57 toward the outermost convolution 47 to form an acute relief angle $A_1$ with the outer most convolution. See FIG. 4. The relief angle $A_1$ may be 11°45', for example. The annular constraining section 71 of each of the lips 59 and 61 is curved radially inwardly with respect to the film roll 37 to enable both of the lips to contact the outermost convolution 47 in a substantially tangential manner (in the vertical sense in FIG. 4) and thereby limit the area of contact between the lips and the outermost convolution. The annular free end section 77 of each of the lips 59 and 61 is tilted slightly upwardly as shown in FIG. 4 to form an acute relief angle $A_2$. The relief angle $A_2$ may be 10°, for example. Thus, as shown in FIG. 2 the lips 59 and 61 are either shaped in the form of a "Z" or an "S".

A pair of rigid identical spreader surfaces 79 and 81 are fixed to the cassette half 9 at separate locations inwardly of the film passage slit 25 as shown in FIG. 2. The respective spreader surfaces 79 and 81 deflect opposite limited portions 59' and 61' of the annular lips 59 and 61 axially away from each other to an axial dimension slightly exceeding the film width. See FIG. 2. In essence, the deflected portions 59' and 61' of the annular lips 59 and 61 are axially spaced sufficiently to prevent those portions of the lips from radially confining corresponding portions of the outermost convolution 47 of the film roll 37. As indicated in FIG. 2, the remaining portions of the two lips 59 and 61 are maintained in place by inner semicircular flat surfaces 83 and 85 of the cassette shell 3. The flat surfaces 83 and 85 abut the respective disks 55 and 56, except in the vicinity of the spreader surfaces 79 and 81. Thus, the remaining portions of the two lips 59 and 61 continue to radially confine the outermost convolution 47.

As shown in FIG. 2, the annular free end section 77 of each of the annular lips 59 and 61, at the deflected portions 59' and 61' of the two lips, bears against the respective spreader surfaces 79 and 81. Since the annular free end section 77 of each of the lips has a gentle curve to it as best seen in FIG. 4, very little wear occurs between the free end section and either of the spreader surfaces 79 and 81. The relief angle $A_2$ of the annular free end section 77 of each of the lips is useful during assembly of the film cassette 1 to position either of the spreader surfaces 79 and 81 relative to an annular free end section.

When the spool core 23 is initially rotated in the unwinding direction U, the two flanges 51 and 53 may remain substantially stationary and the film roll 37, since its inner end 39 is attached to the spool core, tends to expand radially or clock-spring to ensure a non-slipping relation between the outermost convolution 47 of the film roll and the annular lips 59 and 61 of the flanges. Then, rotation of the spool core 23 in the same direction will similarly rotate the two flanges 51 and 53. As a result, the two spreader surfaces 79 and 81 will deflect successive portions 59' and 61' of the annular lips 59 and 61 axially away from each other as the respective portions are rotated past the spreader surfaces. The deflected portions 59' and 61' of the two lips 59 and 61 are returned to their original non-flexed condition by the semicircular flat surfaces 83 and 85 of the cassette shell 3. As can be appreciated from FIG. 3, the leading end 45 of the film roll 37 will be freed from the radial confinement of the two lips 59 and 61 in the vicinity of the two spreader surfaces 79 and 81, and it will be advanced against a pair of rigid identical stripper-guide surfaces 87 and 89 integrally formed with the respective spreader surfaces. The two stripper-guide surfaces 87 and 89 operate to direct the leading end 45 into the film passage slit 25, thereby allowing succeeding portions of the outermost convolution 47 to be freed from corresponding portions of the two lips 59 and 61 as those portions of the lips are deflected by the two spreader surfaces 79 and 81. Consequently, continued rotation of the spool core 23 will thrust the film leader 43 from the inside to the outside of the cassette shell 3.

When the spool core 23 is rotated in the rewinding direction R opposite to the unwinding direction U, the filmstrip will be wound back onto the spool core since the trailing end 39 of the filmstrip is attached to the spool core. Other aspects of this portion of operation of the film cassette 1 are substantially similar to the portion of operation when the spool core 23 is rotated in the unwinding direction U.

The Photographic Camera - Film Transport Apparatus

Figure 5:
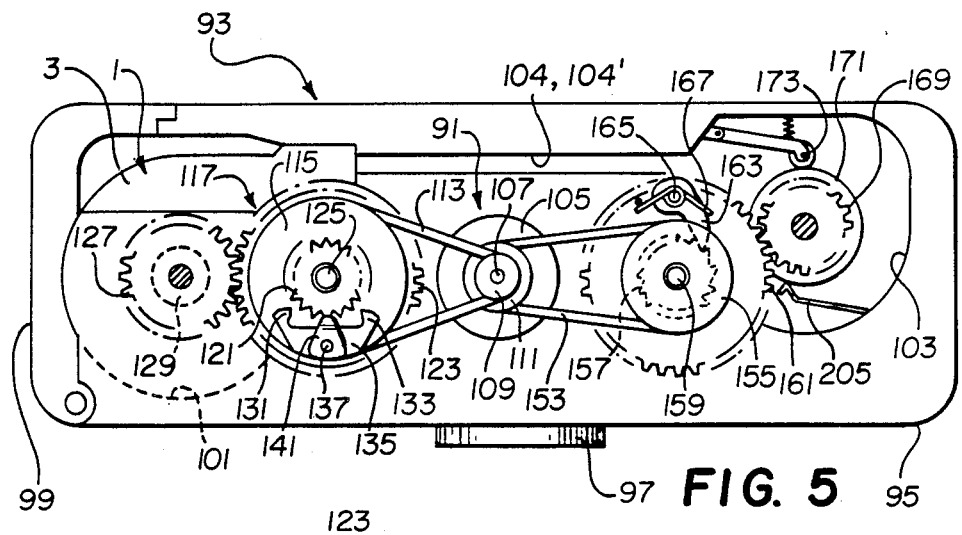
FIG. 5 is a bottom plan view of motor-driven film transport apparatus in a photographic camera to be used with the film cassette depicted in FIGS. 1-4, as disclosed in the cross-referenced application.
Figure 6:
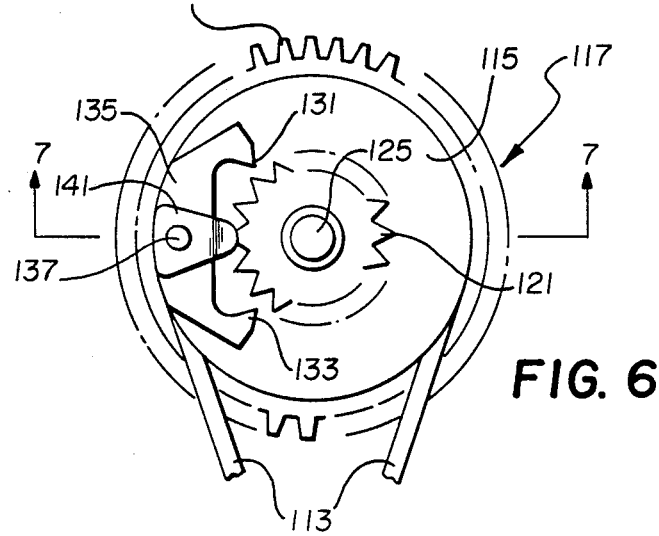
FIG. 6 is a bottom plan view of a bi-directional film drive mechanism of the film transport apparatus.
Figure 7:
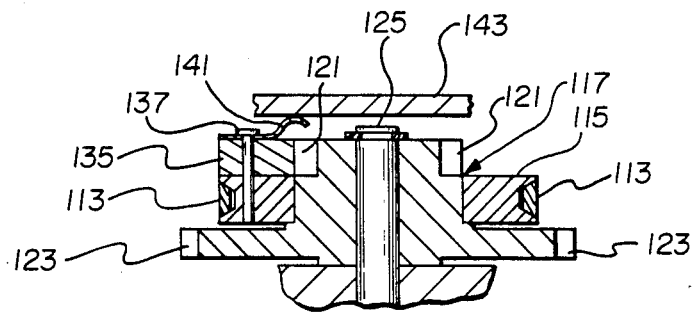
FIG. 7 is a cross-sectional view of the bi-directional film drive mechanism as viewed in the direction of the arrows 7, 7 in FIG. 6.

Referring now to FIGS. 5-7, a motor-driven film transport apparatus 91 for a photographic camera 93 is depicted for use with the film cassette 1. The camera body 95 is shown with a front lens shield 97, a loading door 99 opening to a cassette-receiving chamber 101, a separate film take-up chamber 103, and a film guide channel 104 interconnecting the two chambers to define a film guide path 104' from one chamber to the other one. A conventional bi-directional drive motor 105 which can change its rotational direction by switching the current flow direction to the motor, includes a drive shaft 107. A pair of smaller and larger radius drive pulleys 109 and 111 are coaxially fixed to the drive shaft 107. The smaller drive pulley 109 is drivingly connected via an endless belt 113 to a driven pulley 115, concentrically disposed loosely about a multiple gear unit 117. The multiple gear unit 117 has a smaller circular gear portion 121 and a larger circular gear portion 123, and is mounted for rotation on an idler shaft 125. The larger circular gear portion 123 of the multiple gear unit 117 is arranged to continually engage a gear wheel 127 having an integral coaxial rotation hub 129 which projects from the bottom of the cassette-receiving chamber 101 to engage the two keying ribs 31 and 33 formed with the spool core 23 of the film cassette 1. The smaller circular gear portion 121 of the multiple gear unit 117 is intended to be drivingly engaged by either one of a pair of separate pawl ends 131 and 133 of a bi-directional drive member 135. The drive member 135 is mounted atop the driven pulley 115 via a pivot pin 137, disposed parallel to the idler shaft 125. When the multiple gear unit 117 is rotated in a counter-clockwise direction 139 about the idler shaft 125 as viewed in FIG. 8, a thin leaf spring 141 fixed to the drive member 135 at the pivot pin 137 will drag along a plate-like section 143 of the camera body 95 to swing the drive member about the pivot pin until its pawl end 133 drivingly engages the smaller circular gear portion 121 of the multiple gear unit. See FIGS. 7 and 8. Conversely, when the multiple gear unit 117 is rotated in a clockwise direction 145 about the idler shaft 125 as viewed in FIG. 10, the leaf spring 141 will drag along the plate-like section 143 to swing the drive member 135 about the pivot pin 137 until its pawl end 131 drivingly engages the smaller circular gear portion 121 of the multiple gear unit. Thus, energization of the drive motor 105 with a current flow direction to rotate the smaller drive pulley 109 in a counter-clockwise direction 139' as viewed in FIG. 8, will swing the drive member 135 to position its pawl end 133 in driving engagement with the smaller circular gear portion 121 to in turn rotate the larger circular gear portion 123 in the counter-clockwise direction 139, and thereby will rotate the gear wheel 127 in a clockwise direction 147 to in turn rotate the spool core 23 of the film cassette 1 in the unwinding direction U to thrust the non-protruding film leader 43 from the film cassette (as described in detail above) into the film guide channel 104. Energization of the drive motor 105 with a current flow direction to rotate the smaller drive pulley 109 in a clockwise direction 145' as viewed in FIG. 10, will swing the drive member 135 to position its pawl end 131 in driving engagement with the smaller circular gear portion 121 to in turn rotate the larger circular gear portion 123 in the clockwise direction 145, and thereby will rotate the gear wheel 127 in a counter-clockwise direction 151 to in turn rotate the spool core 23 of the film cassette 1 in the rewinding direction R to return the film leader 43 to the film cassette.

The larger drive pulley 111 is drivingly connected via an endless belt 153 to a driven pulley 155 which, with an integral circular gear portion 157, is mounted for rotation on an idler shaft 159. A gear wheel 161 is concentrically disposed loosely about the idler shaft 159, and is normally coupled to the pulley gear portion 157 by a pawl member 163 for concurrent rotation with the driven pulley 155 in the counter-clockwise direction 139" as viewed in FIG. 8. The pawl member 163 is mounted atop the gear wheel 161 via a pivot pin 165, disposed parallel to the idler shaft 159, and is urged by a torque spring 167 to releasably engage the pulley gear portion 157. The gear wheel 161 continually engages a gear wheel 169 which is coaxially fixed to a rotatably mounted conventional take-up drum or spool 171 in the take-up chamber 103. Film engagement means, not shown, located on the take-up spool 171, and a spring-urged pressure roller 173 serve to facilitate securing of the film leader 43 automatically in a known manner to the take-up spool. When the drive motor 105 is energized with a current flow direction to rotate the larger drive pulley 111 in the counter-clockwise direction 139' as viewed in FIG. 8, the pulley gear portion 157 will be rotated in the counter-clockwise direction 139" to orbit the pawl member 163 in the same direction to in turn similarly rotate the gear wheel 161, and thereby rotate the gear wheel 169 in a clockwise direction 147' to similarly rotate the take-up spool 171. Due to the gear and pulley ratios, the pulley gear portion 157 will be rotated at a sufficient speed which ensures that the take-up spool 171 will take-up the film leader 43 faster than the spool core 23 of the film cassette 1 can be rotated to thrust the film leader from the film cassette. As a result, the film pull or tension exerted at the spool core 23 because of take up of the film leader 43 at the take-up spool 171 will cause the smaller circular gear portion 121 of the multiple gear unit 117 to be overdriven in the counter-clockwise direction 139, whereupon the smaller circular gear portion will disengage from the pawl end 133 of the bi-directional drive member 135 as shown in FIG. 9 to, in effect, uncouple the drive motor 105 from the spool core 23. When the drive motor 105 is energized with a current flow direction to rotate the larger drive pulley 111 in the clockwise direction 145' as viewed in FIG. 10, the pulley gear portion 157 will be rotated in the clockwise direction 145". However, the pulley gear portion 157 will not orbit the pawl member 163 as in the previous instance, because of the inclination of the gear teeth. See FIG. 10. As a result, the pawl member 163 cannot serve to rotate the gear wheel 161, and the take-up spool 11 will only be rotated in a counter-clockwise direction 151' because of the film pull exerted at the take-up spool as the filmstrip F is rewound onto the spool core 23 of the film cassette 1.

Figure 8:
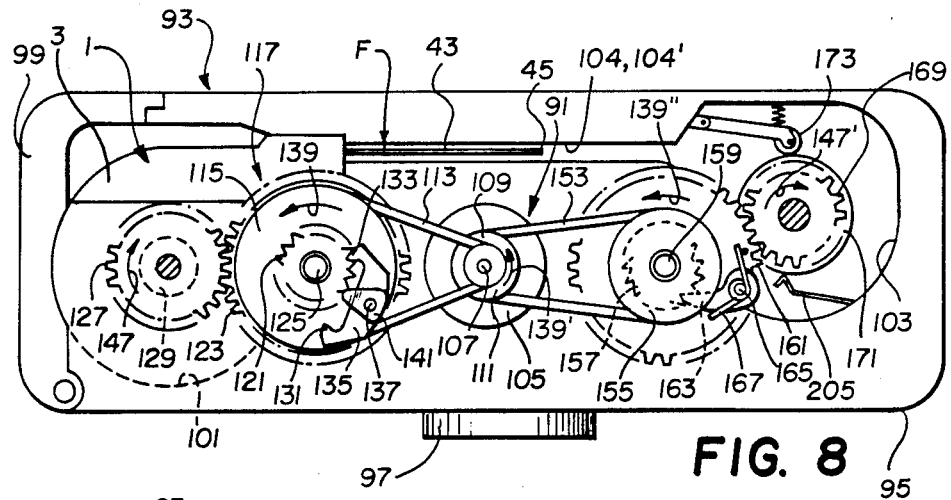
FIGS. 8 and 9 are bottom plan views of the film transport apparatus, showing operation of the bi-directional film drive mechanism in respective modes for rotating the film spool of the film cassette in an unwinding direction and for allowing the spool to be film-driven when the film leader is secured to a take-up spool.
Figure 9:
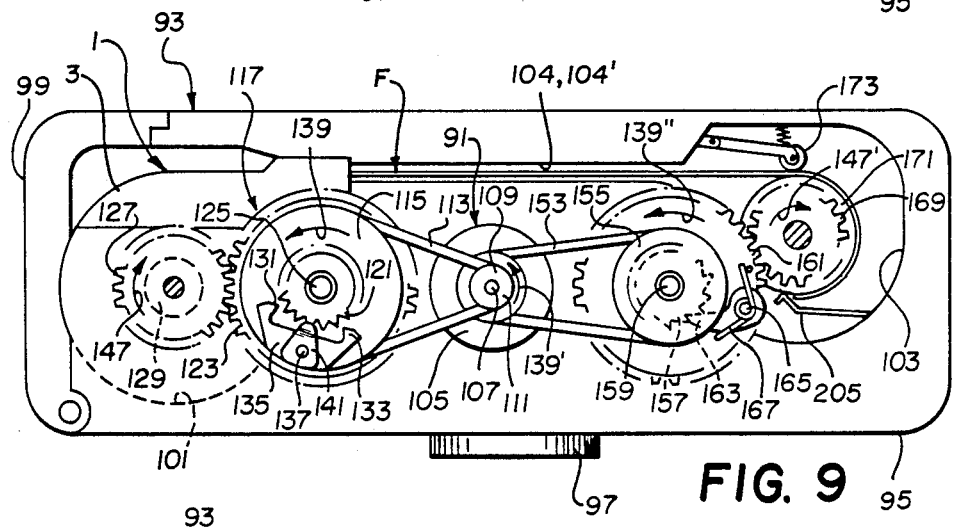
Figure 10:
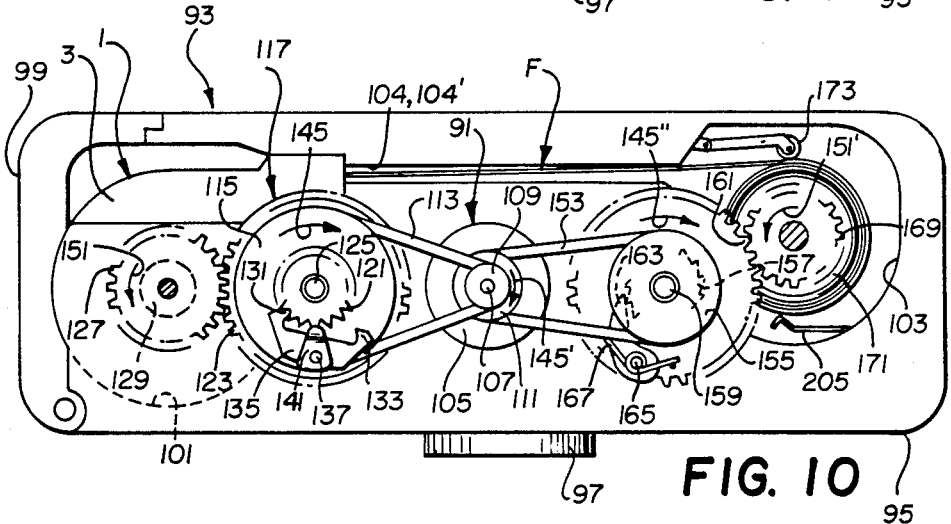
FIG. 10 is a bottom plan view of the film transport apparatus, showing operation of the bi-directional film drive mechanism in a mode for rotating the film spool in a rewinding direction.

It will be appreciated that the bidirectional drive member 135 has respective positions, shown in FIGS. 8 and 10, for effecting alternate one-way driving connections with the spool core 23 to rotate the spool core in the unwinding and rewinding directions U and R in accordance with the rotational direction of the drive motor 105. During advance of the film leader 43 from the film cassette 1 along the film path 104' (defined by the film guide channel 104) to the take-up spool 171, the take-up spool is motor-driven at a faster speed than the spool core 23 is rotated. When the film leader 43 is secured to the take-up spool 173, the drive member 135 permits the spool core to be overdriven by the resulting pull of the filmstrip F exerted at the spool core. During rewinding of the filmstrip F along the film path 104' back onto the spool core 23, the take-up spool 173 is uncoupled from the drive motor 105 to allow the spool core to serve as the only means for film movement.

The Photographic Camera - Control Apparatus

Figure 13:
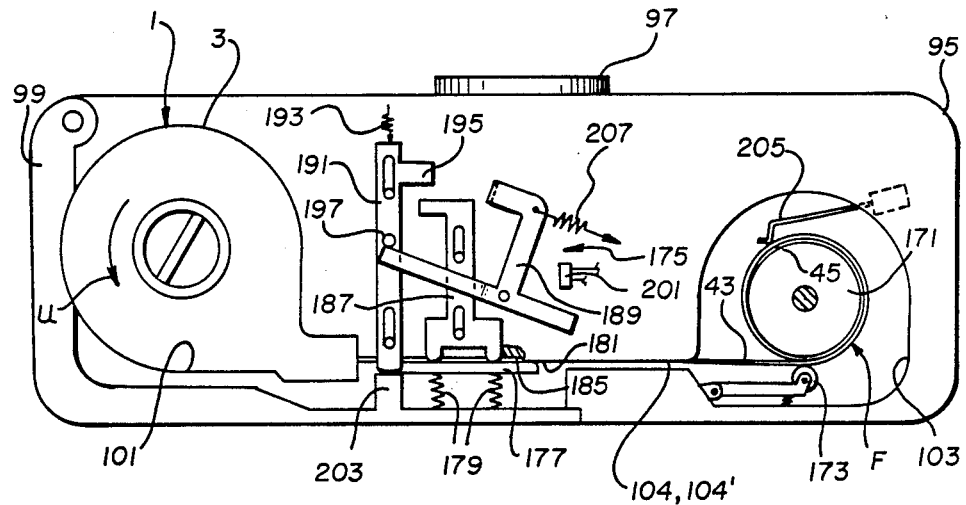
Figure 14:
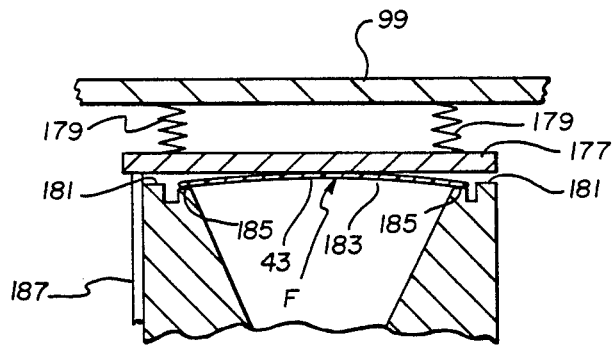
FIG. 14 is a cross-sectional view of the pressure plate and an exposure (back frame) opening, showing the plate retracted from the opening to permit the film leader to naturally curve crosswise.
Figure 15:
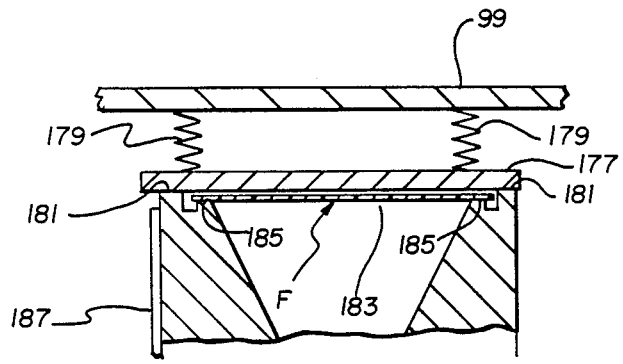
FIG. 15 is a cross-sectional view similar to FIG. 14, showing the pressure plate pressing the filmstrip flat at the exposure opening.

Referring now to FIG. 11, a control apparatus 175 is shown for a film pressure plate 177 supported via a pair of helical compression springs 179 on the loading door 99 of the camera body 95. When the door 99 is closed, as can be seen in FIGS. 13 and 15, the two springs 179 normally urge the pressure plate 177 to an operative position against a pair of plate support ridges 181 to press successive imaging sections of the filmstrip F flat contrary to its natural tendency to curve crosswise as shown in FIG. 14. According to custom, the pressure plate 177 presses successive imaging sections of the filmstrip F flat over an exposure (back frame) opening 183 to the film guide channel 104 preparatory to each picture-taking instance. To hold the filmstrip flat, its respective longitudinal edges rest on a pair of known film support rails 185. See FIG. 15.

A restraining member 187 is slidably mounted within the camera body 95 for movement to a restraining position, shown in FIG. 12, in abutment against the pressure plate 177 for holding the pressure plate contrary to the urging of the two springs 179 in a retracted position, shown in FIG. 12, sufficiently spaced from the exposure opening 183 to permit the filmstrip F to assume its natural cross-curvature. See FIG. 14. A latching member 189 is pivotally mounted within the camera body 95 for movement to a latching position, shown in FIG. 12, for securing the restraining member 187 in its restraining position.

When the door 95 is opened as shown in FIG. 11, a restoring member 191 slidably mounted within the camera body 95 is urged by a helical compression spring 193 downwardly in the same FIG. to cause a finger-like extension 195 of the restoring member to slide the restraining member 187 similarly to an extended position farther than its restraining position and to cause a pin 197 on the restoring member to pivot the latching member 189 counter-clockwise to its latching position. Compare FIG. 13.

During initial closing movement of the door 99, a plunger-type switch element 199, shown in FIG. 11, is depressed by the door to energize an electromagnet 201 in a conventional manner. The electromagnet 201, when energized, serves to hold the latching member 189 in its latching position, shown in FIGS. 11 and 12. Further closing movement of the door 99 causes a finger-like extension 203 of the door to push the restoring member 191 upwardly in FIG. 12 to separate its pin 197 from the latching member 189 and to separate its finger-like extension 195 from the restraining member 187. Then, when the door 99 is completely closed and secured by known means, not shown, the two springs 179 urge the pressure plate 177 to push the restraining member 187 from its extended position, shown in FIG. 11, to its restraining position, shown in FIG. 12. Since the electromagnet is energized to hold the latching member 189 in its latching position, the latching member in turn secures the restraining member 187 in its restraining position. Consequently, as shown in FIGS. 12 and 14, the pressure plate 177 is held in its retracted position sufficiently spaced from the exposure opening 183 to permit the filmstrip F to assume its natural cross-curvature.

If the spool core 23 of the film cassette 1 is rotated in the unwinding direction U to thrust the non-protruding film leader 43 from the film cassette into the film guide channel 104, and the pressure plate 177 is held in its retracted position to permit the filmstrip F to assume its natural cross-curvature as shown in FIGS. 12 and 14, the longitudinal strength of the leader (outside the cassette) is significantly increased to facilitate its being propelled over the exposure opening 183 and to the take-up spool 171. When at least one convolution of the film leader 43 is wound onto the take-up spool 171, a resiliently flexible switch element 205 normally riding on the periphery of the spool is moved by the film convolution to de-energize the electromagnet 201 in a conventional manner. The electromagnet 201 then allows a return spring 207 to pivot the latching member 189 clock-wise in FIG. 13 from its latching position to a non-latching position against the pin 197. Consequently, the two springs 179 can urge the pressure plate 177 from its retracted position to its operative position, shown in FIGS. 13 and 15, to press successive imaging sections of the filmstrip F flat over the exposure opening 183 preparatory to each picture-taking instance.

The invention has been described with reference to a preferred embodiment. However, it will be appreciated that variations and modifications can be effected with the ordinary skill in the art without departing from the scope of the invention. For example, instead of the switch element 205 normally riding on the periphery of the take-up spool 171, the switch element might normally be located within a relieved annular section of the spool as shown in U.S. Pat. No. 4,752,795. When the leader portion 43 is wound onto the take-up spool 171, it covers the relieved annular section to thereby move the switch element outwardly away from the spool.

I claim:

1. A control apparatus for a film pressure plate in a photographic camera to be used with a film cassette in which (a) a film spool is rotatable to unwind a filmstrip off the spool to automatically thrust a non-protruding leader portion of the filmstrip from the cassette to enable the leader portion to be propelled in the camera over an exposure opening and to film take-up means and (b) the filmstrip including the leader portion has a natural tendency to curve crosswise, said control apparatus comprising;
   resilient means for urging said pressure plate normally to an operative position for pressing the filmstrip flat at the exposure opening; and
   restraining means having a restraining mode for holding said pressure plate in a retracted position sufficiently spaced from the exposure opening to permit the filmstrip to assume its natural cross-curvature in order to significantly increase the longitudinal strength of the leader portion to facilitate its being propelled over the exposure opening and to the film take-up means responsive to unwinding rotation of the film spool and having a relaxed mode for permitting said resilient means to urge said pressure plate to its operative position.

2. A control apparatus as recited in claim 1, further comprising:
   change-over means for changing said restraining means from its restraining mode to its relaxed mode responsive to the filmstrip being taken up at the film take-up means.

3. A control apparatus as recited in claim 2, wherein said change-over means includes a film presence sensor for sensing the filmstrip is taken up at the film take-up means.

4. A control apparatus as recited in claim 3, wherein said restraining means includes a restraining member having a restraining position in abutment against said pressure plate for holding the pressure plate in its retracted position contrary to the urging of said resilient means and being movable by the resilient means to permit said pressure plate to be urged to its operative position and latching means for securing said restraining member in its restraining position, said latching means connected to said film presence sensor to release said restraining member responsive to the filmstrip being taken up at the film take-up means.

5. A control apparatus as recited in claim 4, further comprising:
   return means for restoring said restraining member to its restraining position responsive to opening movement of a loading door of the camera.

6. A control apparatus for a film pressure plate in a photographic camera to be used with a film cassette in which a film spool is rotatable to unwind a filmstrip off the spool to automatically thrust a non-protruding leader portion of the filmstrip from the cassette to enable the leader portion to be propelled in the camera over an exposure opening and to film take-up means, said control apparatus comprising:
   means for moving said pressure plate between an operative position for pressing the filmstrip flat at the exposure opening and a retracted position sufficiently removed from the exposure opening to permit the leader portion to be propelled over the exposure opening and to the film take-up means responsive to unwinding rotation of the film spool;
   means for releasably holding said pressure plate in its retracted position; and
   means for causing said holding means to release said pressure plate responsive to the filmstrip being taken up at the film take-up means.

* * * * *